Feb. 28, 1939.   R. D. FRENCH   2,148,612
ELECTRIC TARGET RANGE
Filed Sept. 26, 1936   6 Sheets-Sheet 1

Inventor
Reginald D. French
by Parker & Parker
Attorneys.

Feb. 28, 1939.  R. D. FRENCH  2,148,612

ELECTRIC TARGET RANGE

Filed Sept. 26, 1936  6 Sheets-Sheet 2

Inventor
Reginald D. French
by Parker & Carter
Attorneys.

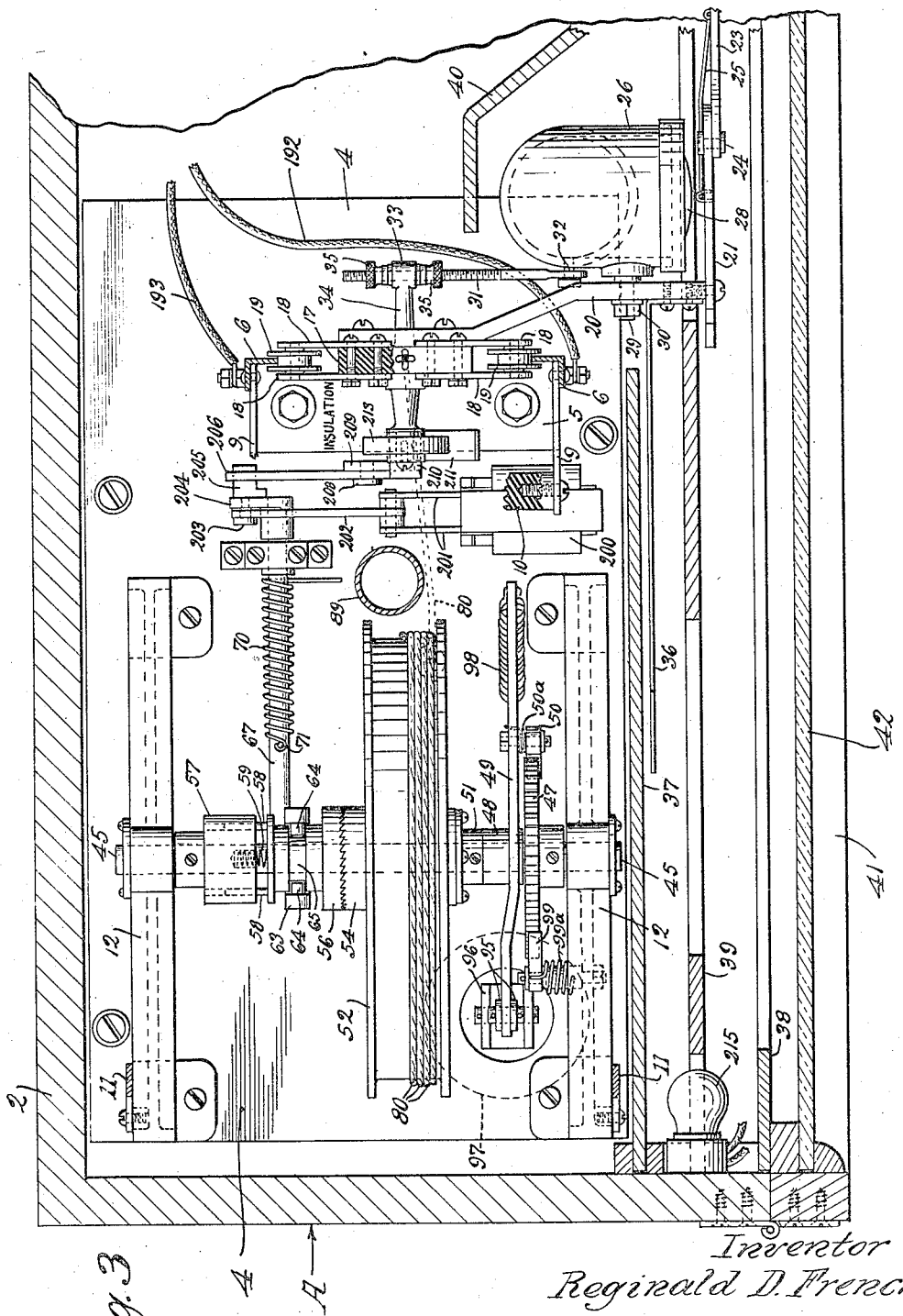

Feb. 28, 1939. R. D. FRENCH 2,148,612
ELECTRIC TARGET RANGE
Filed Sept. 26, 1936 6 Sheets-Sheet 4
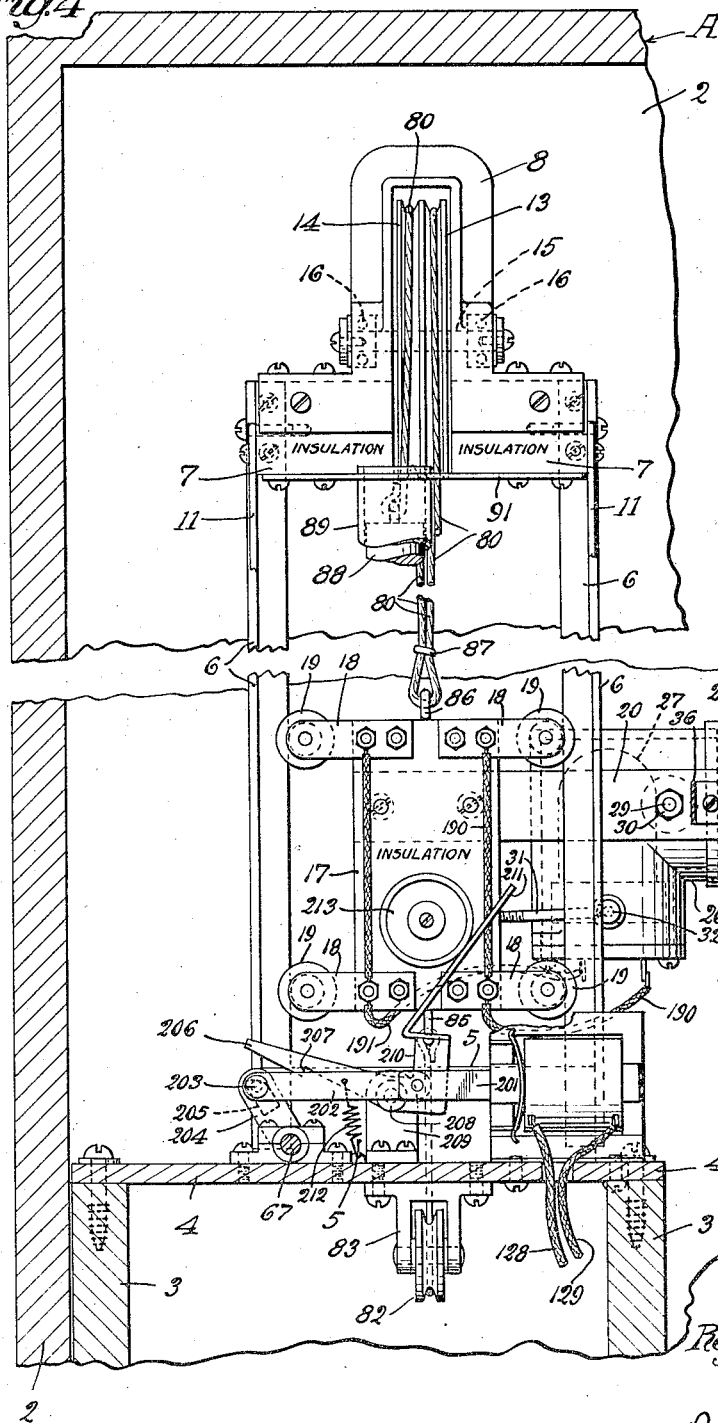
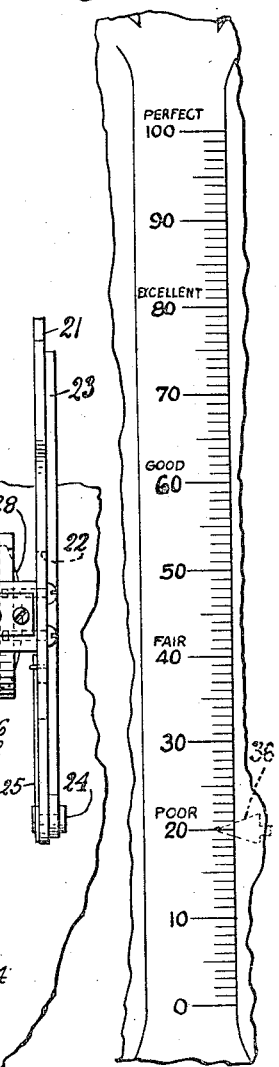
Inventor
Reginald D. French
by Parker & Carter
Attorneys Feb. 28, 1939.  R. D. FRENCH  2,148,612
ELECTRIC TARGET RANGE
Filed Sept. 26, 1936  6 Sheets-Sheet 5
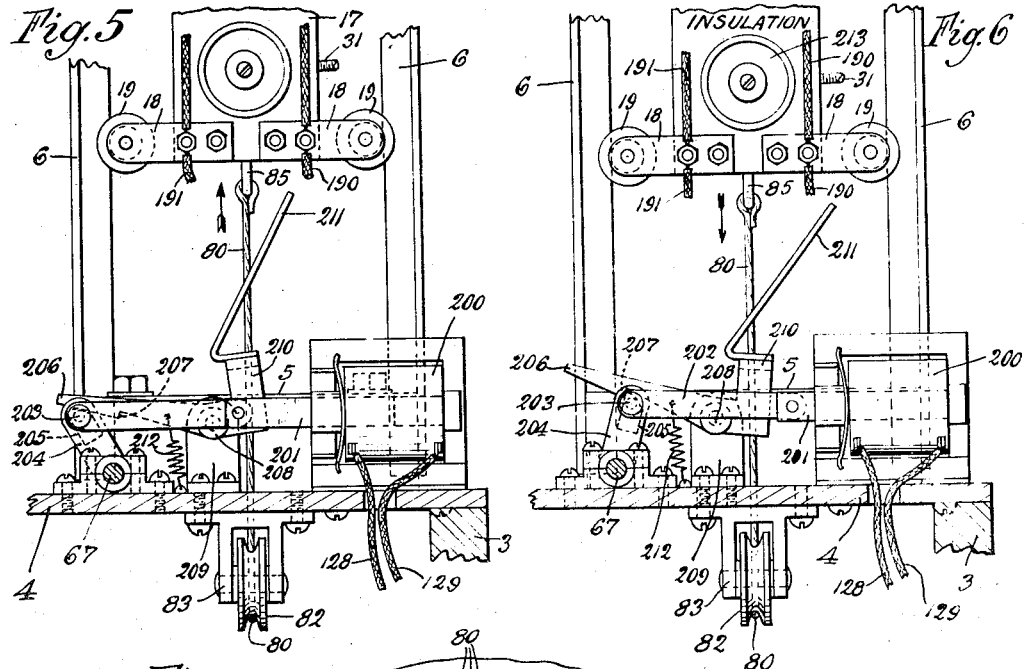
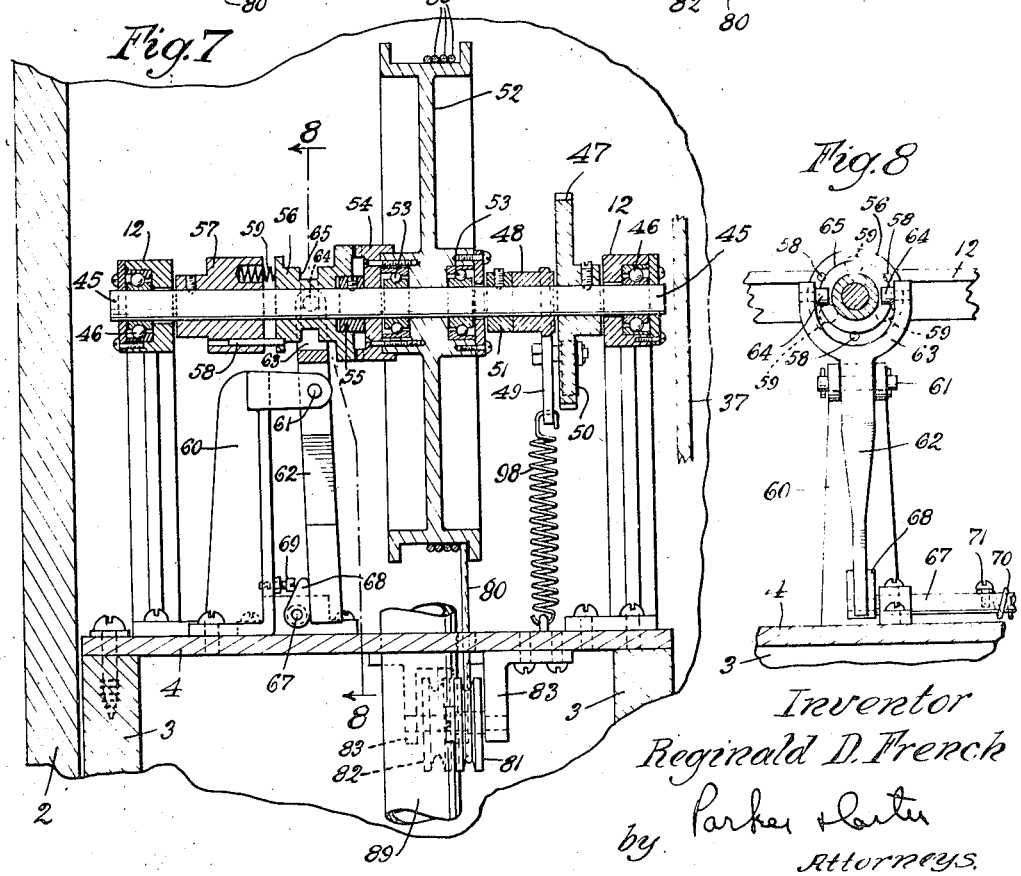
Inventor
Reginald D. French
by Parker & Carter
Attorneys.

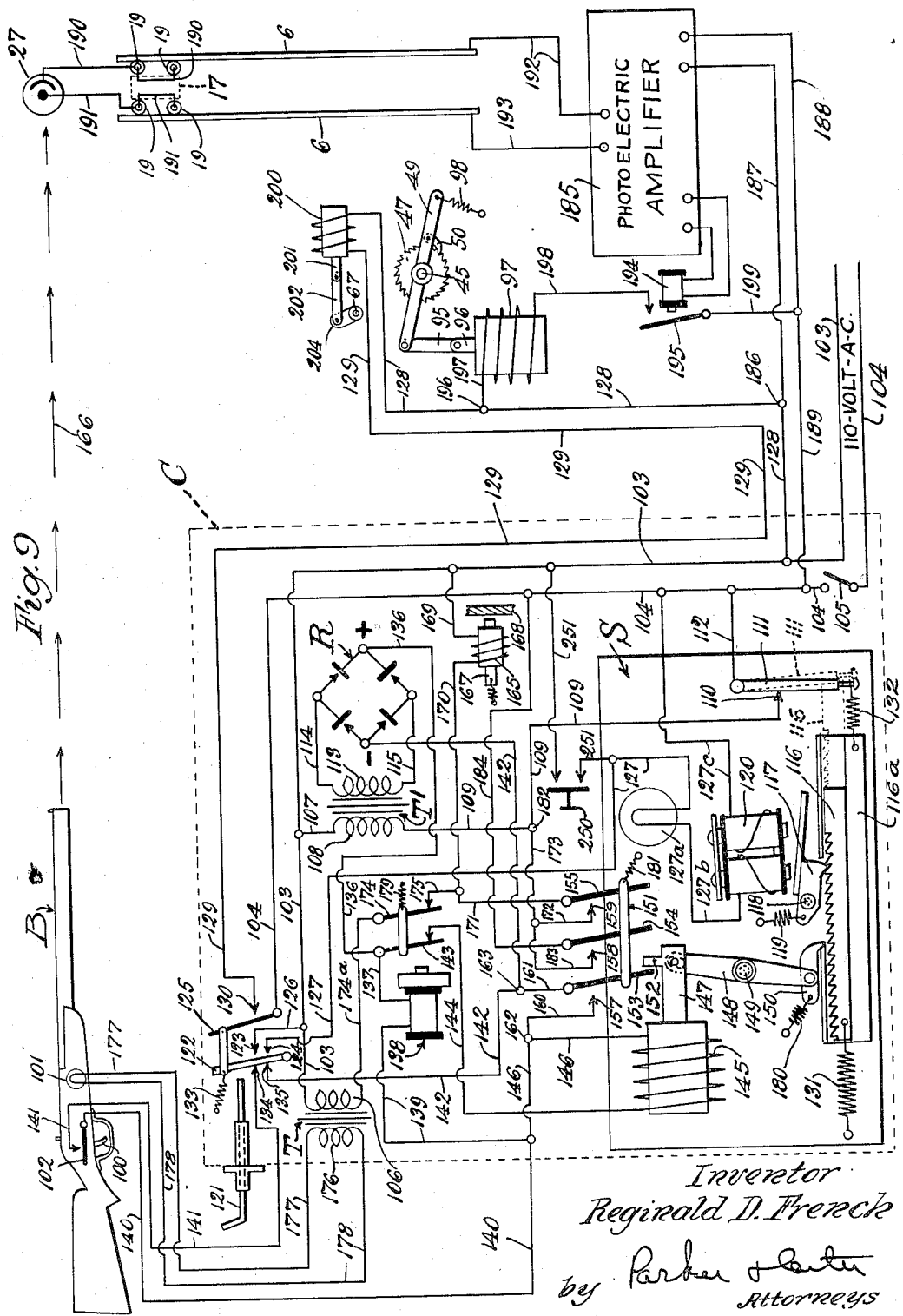

Patented Feb. 28, 1939

2,148,612

UNITED STATES PATENT OFFICE 2,148,612

ELECTRIC TARGET RANGE

Reginald D. French, Glen Ellyn, Ill., assignor to Rayolite Rifle Range Company, Chicago, Ill., a corporation of Oklahoma Application September 26, 1936, Serial No. 102,662

10 Claims. (Cl. 273—101.1)

The invention relates to an improvement in electric target rifle ranges and has for one purpose the provision of such a range in which the operator shoots at a target which is fixed at the time the operator takes aim but which moves in response to a hit.

Another purpose is the provision of means for causing the movement of the target itself to indicate the score or number of hits.

Another purpose is the provision of a type of target which shall have the appeal of novelty and sightliness and which may, for example, indicate an animal such as a squirrel, which is made to climb a tree in response to successive hits.

Another purpose is the provision of improved means for intermittently moving the target in response to a hit.

It is characteristic of the invention that the target has associated with it a photoelectric cell and that the operator uses a gun or the like which projects a flash of light at the cell, the device being actuated in response to the striking of the photoelectric cell by a flash of light from the gun aimed by the operator.

Other purposes will appear from time to time in the course of the specification and claims.

I illustrate my invention more or less diagrammatically in the accompanying drawings wherein:

Figure 3 is a section on the line 3—3 of Figure 2;

Figure 4 is a section on the line 4—4 of Figure 2;

Figure 5 is a fragmentary section of a part of the operating mechanism shown in Figure 4;

Figure 6 is a view similar to Figure 5 illustrating the parts in a different position;

Figure 7 is a section on the line 7—7 of Figure 2;

Figure 8 is a section on line 8—8 of Figure 7;

Figure 9 is a wiring diagram; and

Figure 10 is a view of a variant form of score indicator.

Like parts are indicated by like symbols throughout the specification and drawings.

Figure 1:
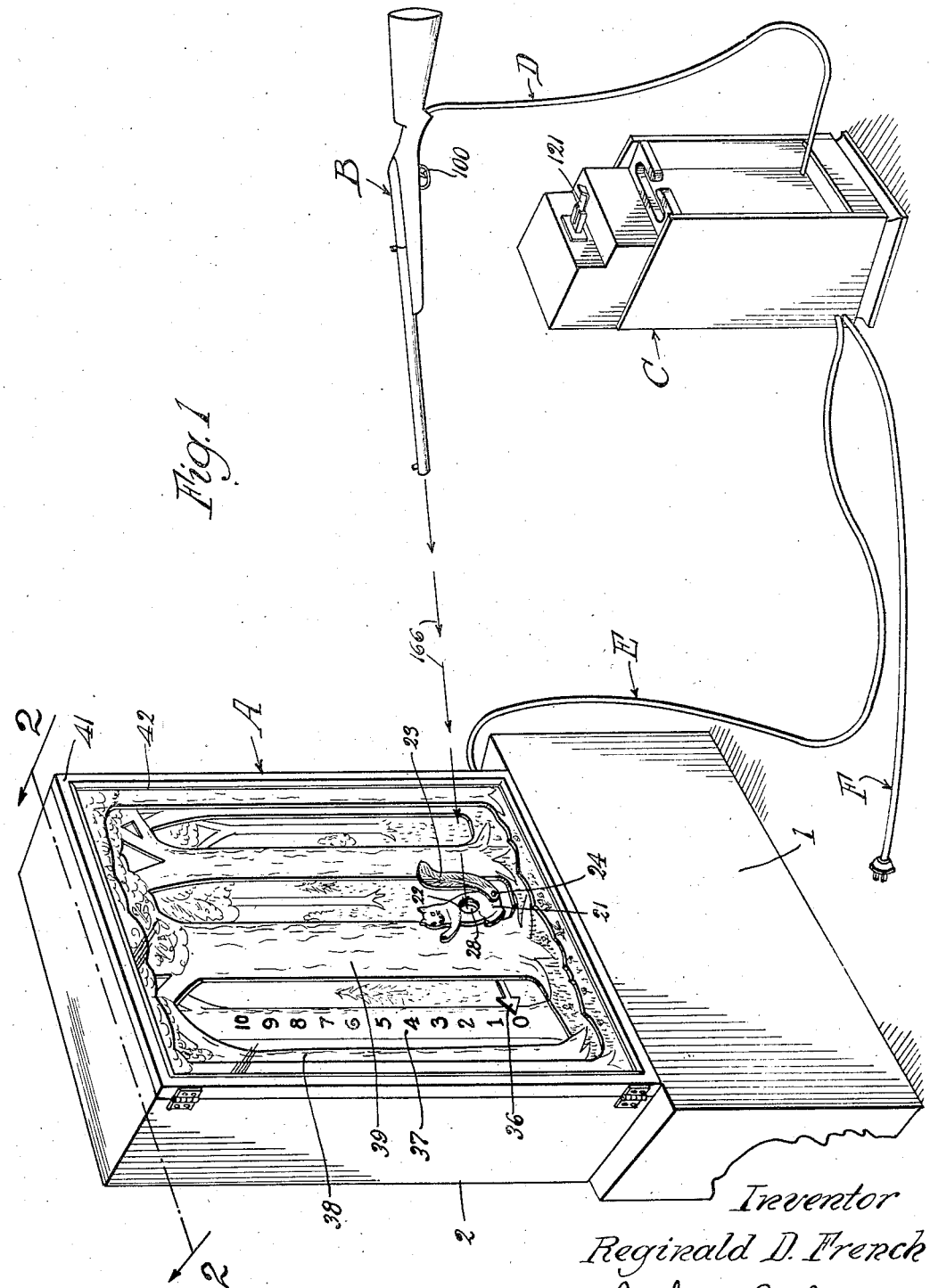
Figure 1 is a perspective view of the entire device.

Referring to Figure 1, the parts may be classified into the target assembly indicated as A, the gun or other firing means indicated as B, and the gun stand or firing post indicated as C.

Referring first to the target assembly, I illustrate any suitable base or support 1 employed to support the target housing 2. It will be understood that the target housing 2 may, if desired, be hung on a wall or otherwise supported, or the parts 1 and 2 can be made integral.

Figure 2:
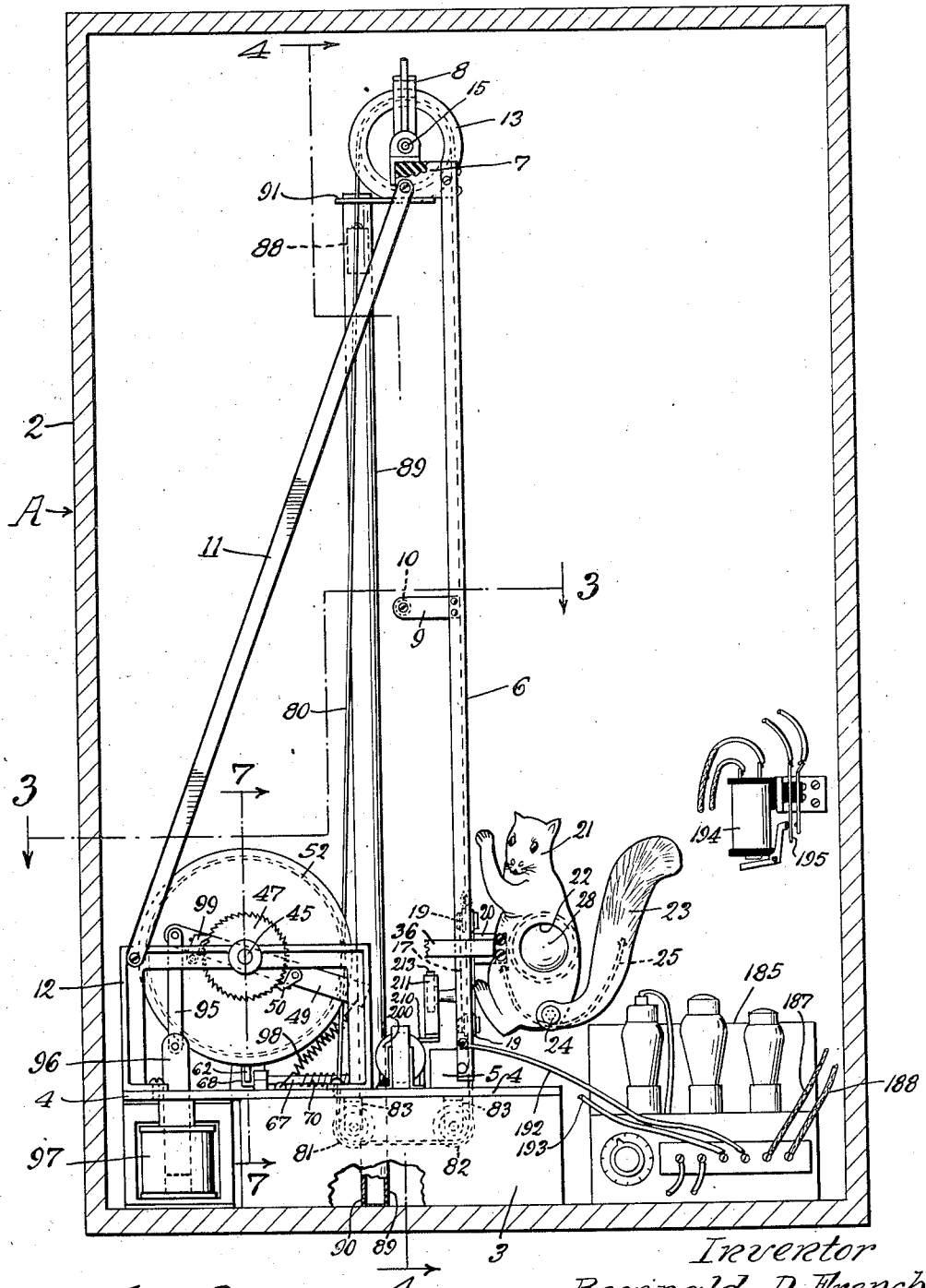
Figure 2 is a section on the line 2—2 of Figure 1.

Referring to the target structure, as shown for example in Figures 2 and 4, I illustrate a supporting box or base 3, herein shown as having positioned at the top thereof a base plate 4 which may be of metal. Mounted on an insulating block 5, positioned on the plate 4, are a pair of laterally spaced rails 6 shown in the form of angles and connected at their top by insulating blocks 7 which in turn are connected by any suitable bracket 8. Thus the two rails 6 are positioned and spaced in relation to each other but are effectively insulated apart. An intermediate spacer may be employed including the brackets 9 and the connecting insulating bar 10. The structure is further supported by two inclined supports 11, the upper ends of which are secured to the blocks 7, and the lower ends to supporting frames 12, the purpose of which will later appear.

Rotatably mounted within the bracket 8 are the pulleys 13, 14 which may be mounted for unitary movement upon a shaft 15 with roller bearings 16. It will be understood that the two pulleys rotate in unison and in fact are shown as an integral structure.

Mounted for movement along the rails 6 is the moving target base generally indicated as 17 which may be of insulating material. Mounted at each corner thereof is a bracket 18, carrying a wheel 19, the wheels 19 being flanged or grooved, as shown in Figure 3, to engage the angles 6. Mounted upon the base 17 is any suitable bar or bracket or support 20 on which is mounted the target member proper 21, herein illustrated in the form of a squirrel, with an aperture 22 and a tail 23 which may be pivoted as at 24 and which may be provided with a spring 25 to permit a limited oscillation or twitching of the tail when the squirrel is moved in response to a hit. Positioned on the bracket 20 is a housing 26 in which is held a photoelectric cell 27 which may be provided with any suitable lens 28.

The housing may be mounted on the bracket 20 as by a stem 29 and lock nut 30, whereby the housing may be angularly adjusted in relation to the bracket. The adjusting means may be effected by the screw threaded stem 31 pivoted at its inner end to the housing as at 32 and passing at its outer end through a sleeve 33 on a stem 34 extending outwardly from the carriage 17. 35 are lock nuts whereby the longitudinal adjustment of the member 31 in relation to the support 33 may be made. Thus the housing for the photoelectric cell may be tilted at any desired angle, depending upon the height of the member 2 in relation to the eye of the marksman. For instance, it might be suspended high on a wall, or it might be positioned at or below the eye level.

Also associated with the bracket 20 I illustrate a pointer 36 which, as shown in Figure 1, may be alined with any suitable score indicating device 37 which, in Figure 1, is shown as a separate panel, painted to represent a tree and provided with a row of vertically alined numerals, or a percentage scale as shown in Figure 10.

I illustrate also a front panel 38 in the form of a frame, which may be painted to represent trees and the like, and an intermediate panel 39, which is cut away to form a plurality of trees along one of which the squirrel 21 appears to climb. A fourth panel is illustrated as at 40 and is shown in Figure 3. The four panels together serve to mask the machinery and to give the illusion of a forest of trees, one of the tress being the one climbed by the squirrel and another being the tree along which the score is indicated by the pointer 36. I illustrate also a hinged front 41, with a pane of glass 42, whereby access to the interior may be had.

Mounted on the frames 12, there being two such frames as shown in Figure 7, is a shaft 45 which rotates in any suitable ball bearings 46 in the frames 12. Secured against movement in relation to the shaft 45 is a ratchet wheel 47. Loose on the shaft 45, adjacent the ratchet 47, is a boss 48 associated with a lever 49 which carries a dog 50 opposed to the ratchet 47 and held in engagement therewith by a spring 50a. 51 indicates a spacing sleeve mounted on the shaft 45. 52 indicates a pulley or drum which, if a chain drive were substituted, would be in the form of a sprocket. The pulley 52 is preferably mounted upon suitable ball bearings 53 as illustrated in Figure 7. 54 indicates a clutch member secured to and rotating in unison with the drum 52. 55 is a spacer sleeve secured to the shaft 45. 56 is a movable clutch element slidable along the shaft 45 and held against rotation in relation thereto. Associated with it is a fixed member 57, secured to the shaft 45, the two being connected by interpenetrating pins 58. 59 are springs which tend normally to thrust the clutch member 56 in the direction of the opposed clutch member 54.

I provide the following means for separating the clutch and freeing the drum 52 for rotation in relation to the shaft 45. An upstanding bracket 60 has pivoted to it as at 61 a lever 62 provided with a yoke 63 having inwardly extending pins 64 which penetrate a circumferential slot 65 in the clutch member 56. Controlling the lower arm of the lever 62 is a rotary shaft 67 mounted in suitable bearings having a terminal cam 68 opposed to the lever 62. The shaft 67 is normally held with the cam 68 in the position in which it is shown in Figure 7 against the adjustable stop 69 by the coil spring 70 which surrounds the shaft 67, one end being fastened to the shaft as at 71 and the other resting against the base 4. The means for rotating the shaft 67 will later be described.

Surrounding the drum 52 is a cable 80 which is wound about the drum 52 several times to insure frictional engagement and to prevent slippage. It then passes about pulleys 81 and 82 mounted beneath the base 4 on any suitable brackets 83, and extends upwardly through any suitable aperture in the base 4, and is connected to the carriage 17 as at 85. Extending in the opposite direction from the drum 52 the cable 80 passes upwardly over the pulley 13 and then downwardly through the loop 86 on the carriage 17 where it may be knotted, or otherwise secured, as at 87.

The cable then continues upwardly over the pulley 14 and downwardly to a counterweight 88 which is mounted to slide in the vertical tube 89 which conforms closely to the diameter of the counterweight in such fashion that the tube serves as a dash pot. A small aperture 90 permits the escape of air from or the entry of air into the dash pot, and controls the speed of movement of the weight 88 and thus of the carriage 17 with the squirrel 21. The vertical tube 89 is supported by the plate 4 and adjacent the pulleys 13, 14 by a plate 91, secured to the insulating blocks 7. The plate 91 is apertured to permit passage therethrough of the cable 80.

In order to actuate the lever 49 I illustrate a link 95 pivoted at its upper end to the lever 49 and at its lower end to the solenoid plunger 96 which is controlled by the solenoid coil 97 which is energized in response to a hit of a flash of light on the photoelectric cell 27 in a manner which will below be described. It will be understood that at each hit the solenoid plunger 96 is depressed and the dog 50 on the lever 49 rides over the ratchet 47. When the circuit through the solenoid 97 is broken, the spring 98 draws the lever 49 back to the position in which it is shown in Figure 2 and the dog 50 imparts rotation to the ratchet wheel 47 and thus to the shaft 45, and to the drum 52 which is normally held against movement in relation to the shaft 45 by the clutch mechanism above described. The pawl 99 on the frame 12, by means of any suitable spring 99a, also engages the teeth of the ratchet wheel 47 and prevents unintended retrograde movement of the ratchet wheel, thus holding the squirrel in raised position after it has been lifted.

It will be understood that at each shot which records a hit, the solenoid is energized for an instant and moves the lever 49 which, through the spring 98, after the solenoid is released, moves the drum 52 one step, and thus lifts the squirrel 21 and its associated carriage 17 one step. Assume that the user scores ten successive and accurate hits, the squirrel is raised to the top of the tree with the pointer 36 pointing at the number 10 on the panel 37. In practice, I find that with the ordinary commercial photoelectric cell, a full hit may result in a more complete actuation of a solenoid than a partial or borderline hit. In other words, the better the aim of the operator, under some circumstances, the greater the distance traveled by the target. This is a point of advantage, as placing a premium on accuracy.

Indicated at B in Figure 1 is the gun which directs a flash of light at the target in response to each pull of its trigger 100. The details of the gun are not herein shown but it will be understood that the result of the trigger pull is the release of a very brief flash of light which may be described as a bullet of light, the gun, of course, includes a source of light, such as the bulb 101, and a switch 102 adapted to be closed by a pull of the trigger 100. The energizing circuits are below described. Referring to the wiring diagram, Figure 9, a source of outside 110 volt current is indicated at 103, 104, although it will be understood that any suitable voltage may be employed and the device may be operated on direct current. However, for convenience, I illustrate it in connection with 110 volt alternating current. 105 indicates any suitable manually controlled switch whereby the entire circuit may be broken.

Referring first to the mechanism in the gun cabinet, the line 103 may be traced to the primary coil 106 of the transformer T. A connecting line 107 extends from the power line 103 to the primary coil 108 of a transformer T' which supplies current of preferably lower voltage for various electrical parts associated with the operation of the device. The opposite end of the primary coil 108 is connected to a line 109 leading to a contact point 110 cooperating with a movable switch member 111 which is connected by means of a line 112 to the other power line 104. The secondary coil 113 of the transformer T' is connected by the lines 114 and 115 to the rectifier R.

When the device is not in operation the switch member 111 is held in open position, the dotted line position illustrated in Figure 9, by means of a rack bar 116 which is part of a mechanism of a shot counter S. A detent 117, pivoted as at 118 to the panel of the shot counter, is normally held in engagement with the teeth of the rack bar 116 by means of a spring 119. Cooperating with the detent 117 is a reset magnet 120 herein shown as including two electro-magnets which may be electrically energized by manipulation of a coin slide 121 mounted on the gun cabinet C. The manually controlled coin operated coin slide 121 serves to move a switch member 122 in engagement with the switch contacts 123 and 124, and simultaneously closes a second switch 125. Closure of the contact members 123 and 124 by the switch member 122 closes a circuit through the reset magnets 120 which may be traced from the power line 103 by a line 126 leading to the contact 123, a line 127 from the contact 124 extending to a light 127a, thence through a line 127b to one side of the reset magnet 120. A line 127c continues from the opposite side of the reset magnet to the other power line 104. The light or bulb 127a merely serves as a voltage reducer for the reset electro-magnets.

The switch member 125 closes a circuit through a solenoid 200, the function of which will be later described. The circuit for the solenoid 200 is as follows: A line 128 extends from the power line 103 to the solenoid 200 and continues by means of a line 129 to a contact member 130 associated with the switch 125, which in turn is connected to the other power line 104.

The reset magnet 120 when energized rotates the dog 117 out of engagement with the teeth of the rack bar 116 and the rack bar is free to be moved to the full line position of Figure 9 by a spring 131. The result is a closure of the movable switch member 111 with its opposed contact point 110 by means of a spring 132 to close the circuit through the transformer T' previously described. The switch members 122 and 125 are returned to their initial position by a spring 133 as soon as the operator releases the coin slide 121, thus breaking the circuits through the reset magnets 120 and the solenoid 150.

The switch member 122 then makes a connection between the contact members 134 and 135. The device is now ready for use, and the operator may commence to shoot at the target 21. When the operator pulls the trigger 100 of the gun B, which momentarily closes the switch 102, the following electrical circuits are completed. One of the circuits may be traced from the positive terminal of the rectifier R through the line 136, the line 137, a slow acting magnet 138, the lines 139, 140, to the switch 102, thence through the line 141 to the contacts 134 and 135, closed by the switch member 122; a line 142 completes the circuit to the negative terminal of the rectifier R. In addition, a shunt circuit is completed from the line 136 through the switch member 143 associated with the slow acting magnet 138, the line 144 leading to the solenoid 145 of the shot counter S, from which a line 146 extends to the line 140 leading to the switch 102 of the gun B.

Each time the trigger 100 is pulled, the shot counter solenoid 145 moves its plunger 147 towards the left, referring to Figure 9, and rotates a lever 148 counterclockwise about a pivot 149. A pawl 150, pivoted to the free end of the lever 148, in turn engages the rack bar 116 and moves it towards the right the distance of one tooth against the tension of the spring 131. The solenoid plunger further closes a multiple switch 151, in any suitable manner, for example by means of an abutment 152, and closes, by means of the movable switch members 153, 154 and 155 in engagement with their respective switch contacts 157, 158 and 159, the following circuits. First, holding or shunt circuits for the shot counter solenoid 145 and for the slow acting electromagnet 138 are completed through the switch member 153 in engagement with the contact 157 by shunting the lines 160 and 161 across the lines 146 and 142, respectively, at the intersecting points 162 and 163. The circuit for the slow acting electro-magnet 138 is from the positive terminal of the rectifier R through the lines 136, 137, the slow acting electro-magnet 138, lines 139, 146, intersecting point 162, line 160, contact 157, movable switch member 153, line 161, intersecting point 163, and the line 142 to the negative terminal of the rectifier R. Also, the parallel connected shot counter solenoid 145 is shunted across the power lines of the rectifier R by the switch member 153 by the switch 143, associated with the slow acting electro-magnet 138, the line 144 leading to the shot counter solenoid 145, and the line 146 from the said shot counter solenoid, connected at the intersection point 162 to the line 160 of the contact 157.

The movable switch member 155 of the multiple switch 151, when in contact with its cooperating contact member 159, closes electrical circuits through a thud sounder solenoid 165 and through the transformer T for supplying power momentarily to illuminate the light source 101 in the gun B to project a flash of light, diagrammatically indicated by arrows 166 in Figures 1 and 9, towards the photoelectric cell 27 associated with the target structure previously described. The circuit for sounding the thud sounder for producing in effect the report of a short which may, for example, be produced by the movable plunger 167 striking a board 168, includes a line 169 connected to the main power line 103, the coil of the thud sounder solenoid 165, the lines 170, 171, the movable switch 155 in engagement with the contact 159, the lines 172, 173, 109, contact member 110, and movable switch contact 111 and the line 112, which is connected to the other main power line 104.

The circuit through the transformer T is as follows: From the main power line 103 through the primary winding 106 of the transformer T, the line 174a, the movable switch member 174 in engagement with the switch contact on the line 175, the line 171 leading to the movable switch member 155 of the multiple switch 151, thence through contact 159, lines 172, 173, 109, contact 110, movable switch member 111 and line 112, to the other main power line 104. The primary coil 106 of the transformer by induction energizes the secondary coil 176 and by means of the lines 177, 178 illuminates the light source 101 in the gun B.

The movable switch members 174 and 143 open in unison in response to actuation of the slow acting electromagnet 138, but normally are held in closed relationship with their cooperating contacts on the lines 114, 175 by means of a spring 179.

Closure of the intermediate movable switch member 154 of the multiple switch 151 in response to actuation of the shot counter solenoid results in closing electrical shunt circuits for the primary windings 106 and 108 of the transformers T and T', respectively, and the thud sounder solenoid 165. However, its functions are primarily intended to be effective after a predetermined number of shots have been fired and a description of its purpose will later appear.

The construction of the slow acting electromagnet 138 is such as to function to open the switch members 143 and 174 after the shot counter solenoid 145 has completed its operation of moving the rack bar 116 one step. Opening of the switch member 174 breaks the circuit of the transformer T. However, the interval between closure of the switch member 155 of the multiple switch 151 and consecutive opening of the switch 174 permits the gun lamp 101 to project momentarily a beam of light.

Opening of the switch member 143 breaks the electrical circuit through the shot counter solenoid 145 and a spring 180, interposed between the pawl 150 and any suitable abutment upon the panel of the shot counter S, returns the lever 148 and solenoid plunger 147 to its initial position, illustrated in Figure 9. Retrograde movement of the rack bar 116, slidably maintained in any suitable guiding bracket 116a, in response to the tension of the spring 131, is prevented by the detent 117. In addition, the multiple switch 151 is returned to open position by a spring 181.

At each consecutive trigger pull of the gun, the rack bar 116 advances one step until, at the tenth trigger pull, assuming that the various parts of the device are proportioned and adjusted for ten shots to complete a cycle of operation, the rack bar 116 moves the movable switch member 111 to the dotted line position of Figure 9 and breaks the connection with the contact 110. The shunt connections established by the closure of the intermediate switch member 154 of the multiple switch 151 with the contact 158 continue to provide closed circuits of the transformers T and T' and the thud sounder solenoid 165, which previously had been partially closed, referring to the circuits of the transformer T and thud sounder solenoid 165, and completely closed in reference to the transformer T' by closure of the switch member 111 of the shot counter S.

The circuit of the primary winding 108 of the transformer T' may now be traced from the main power line 103 through lines 107, 109, intersecting point 182, lines 173, 183, contact 158, switch member 154, thence along the line 184 to the other main power line 104. The circuits of the thud sounder solenoid 165 and transformer T are shunted from their common line 172 connected to the contact 158 across the line 183, contact 158, switch 154 and wire 184, connected to the power line 104, until the slow acting electromagnet 138 again opens the switch members 143 and 174, thereby breaking the circuit of the shot counter solenoid 145, causing in turn the multiple switch 151 to be opened. The device is then rendered inoperative until the coin operated coin slide is again manipulated.

Assuming that during the cycle of operation the operator has been successful in obtaining a hit, that is to say, in hitting the photoelectric cell 27 with a flash of light from the gun light 101, the solenoid 97 in the target cabinet A is energized to raise the target 21 and pointer 36 one step in the following manner.

The photoelectric amplifier 185 of standard construction, which may be mounted in the target cabinet 2, receives electric current from the main power line 103 through the line 128 connected at intersection point 186 with the line 187 and the lines 188 and 189, connected to the other main power line 104. The switch 105 controls the circuit of the amplifier 185. The photoelectric cell 27 is connected by wires 190 and 191 with the brackets 18 on the carriage block 17. The rollers 19 maintain electrical connection with the rails 6. Note that a pair of rollers 19 engage each rail 6 and are electrically insulated from each other by an insulating block 17. The wire 190 is connected to convey current through one pair of rollers whereas the wire 191 serves electrically to connect the other pair of rollers with the photoelectric cell 27. The rails 6 are provided with electrical connections 192, 193 extending to the photoelectric amplifier, which may be of any suitable standard construction, and which serves to energize a relay 194 to close a switch 195 in response to actuation of the photoelectric cell 27 when hit by a light ray. The switch in turn closes a circuit through the solenoid 97 from the main power line 103 through the wires 128 connected at intersection point 196 to a line 197 leading to the coil of the solenoid 97, thence through wire 198, switch 195, and wires 199, 189 to the other power line 104.

It will be seen from the above description that each time a hit is scored upon the photoelectric cell 27 a relay 194 is energized by means of the photoelectric amplifier 185 and the solenoid 97 is actuated and raises the target structure one step.

Referring to Figure 9, a service switch 250, interposed in the line 251, serves to close a circuit through the reset magnets 120 of the shot counter S. The reset mechanism, for returning the operation of the device for a new series of shots, is as follows:

200 indicates the coil for the reset solenoid, with which is associated the solenoid plunger 201 which in turn has pivoted to it a link 202 pivoted in turn as at 203 to a crank arm 204 on the shaft 67. The crank 204 is provided with a projection 205 upon which rests the lock lever 206 with its notch 207. This lever is pivoted as at 208 to a bracket 209 on the base 4. Forming part of the lever 206 is the portion 210 upon which is mounted the trip lever 211. When a coin is inserted and the coin slide 121 is actuated and closes the switch 125, the solenoid coil 200 is energized and draws in the plunger 201 and thereby rotates the shaft 67. This shaft is rotated far enough for the notch 207 of the lock lever 206 to engage the extension 205 of the crank 204. The spring 212 then holds the parts in the position in which they are shown in Figure 6 until the falling carriage 17, by the roller 213, engages the trip portion 211 and lifts the lever 206, thereby releasing the shaft 67 to be rotated back into its initial position by the spring 70.

It will be understood that when the reset solenoid is actuated the result of the rotation of the lever 67 is to disengage the clutch 56 and to permit the drum 52 to rotate in relation to the shaft 45, whereby the carriage 17 and the squirrel 21 drop by gravity to their initial bottom position. But when the carriage roller 213 engages the trip 211, then the shaft 67 is returned to its original position by the spring 70 and this again closes the clutch connection by moving the member 56 into clutching contact with the member 54, whereby the drum 52 is again held against movement in relation to the shaft 45 and is positioned for the step by step movement above described.

In Figure 4 the parts are shown after the resetting, with the target ready for the first shot. In Figure 5 the parts are illustrated after the carriage has started its upward movement and after the disengagement of the roller 213 from the trip 211 has permitted the spring 212 to move the lock lever 206 back into its initial inoperative position. Figure 6 illustrates the parts after the reset solenoid is operated and at a time when the lock lever 206 is in locking position, and prior to the time that the roller 213 has struck the trip 211. It will be understood that the downward movement of the carriage is damped by the dash pot action between the counterweight 88 and the tube 89, whereby there is no shock or breakage.

The panels 37, 38 and 39 may be illuminated in any suitable manner, for example, by electric light bulbs, one of which is illustrated at 215 in Figure 3, which may be positioned in alinement with notches in the intermediate panel 39 at either side of the cabinet 2.

It will be realized that, whereas I have described and illustrated a practical and operative device, nevertheless many changes may be made in the size, shape and disposition of parts without departing from the spirit of my invention. I, therefore, wish my description and drawings to be taken as in a broad sense illustrative or diagrammatic, rather than as limiting me to the precise showing. For example, instead of employing a single target, I may employ two of the devices shown, side by side, either in adjacent housings or in the same housing or cabinet, in such fashion that two marksmen can simultaneously operate the device in competition.

The use and operation of my invention is as follows:

Stating the operation briefly, and without a too detailed rediscussion of the various parts, I illustrate a target structure A which includes the squirrel 21 and the pointer 36. The user points the gun beam at the target and tries to shoot through the hole 22 in the squirrel, thereby hitting the photoelectric cell 27 with a short flash of light. Assuming that the parts are in initial position as shown in Figure 1 and ready for use, each hit scored will cause the squirrel 21 to move one step upwardly along the tree in the panel 39. If every shot is a hit, and the shot limiting means are limited to ten, ten shots will move the squirrel at or near the top of the tree, with the pointer 36 opposite the numeral 10. Then, at the tenth shot, in accordance with the mode of operation earlier described, the device is cut off from further operation until the coin operated switches 122 and 125 are again closed by manipulation of the coin slide 121.

Where I employ two associated target devices, for competitive shooting, the earlier described feature whereby the more accurate the hit the greater the distance traveled is very advantageous. Both competitors may make ten hits, but in that case the competitor who most accurately centers his shots will move his target farther or higher.

Assuming that the user inserts a coin and operates the switch 125, then the reset solenoid 200 is energized and the drum 52 is permitted to rotate on the shaft 45. The carriage 17 and the squirrel 21 then move gravitally to their initial position at the botom, their drop being damped by the dash pot 88, 89. When the carriage 17 approaches its bottom posiion, the roller 213 strikes the trip 211 and thereby the clutch connection between the drum 52 and the shaft 45 is re-engaged and the device is ready for further operation. At the same time, the closure of the coin operated switch 122 provides energy for the bulb 101 so that the circuit is ready whereby the operator can energize the bulb 101 in response to the pull of the trigger 100 and the closure of the gun switch 102. By the operation of the structure already described, each trigger pull operates the shot limit mechanism in such fashion that at the tenth trigger pull the device is again put out of use, awaiting the insertion of a further nickel.

As a matter of convenience, the conductive connections between the gun B and the gun stand C, and between the gun stand C and the target A are flexible cables D and E as shown in Figure 1. Thus the gun stand or firing post can be moved in relation to the target, or the target can be shifted without shifting the gun stand. The gun itself is under the complete control of the operator and can be aimed just as of it were not connected to the rest of the structure. An additional cable F from the gun stand C may contain the main power lines, referred to in the electric diagram of Figure 9 as the power lines 103 and 104.

I claim:

1. A target apparatus comprising a target element, a photosensitive cell movable with the target element, means for guiding said target element along a generally upward path, a flexible driving cable for said target element, a drive shaft, a drum thereon about which said flexible cable passes, a clutch connection between said shaft and drum, means for rotating said shaft in response to the hit of a flash of light against said cell, clutch means effective normally to cause said drum to move in unison with said shaft, means for declutching said clutch means whereby to cause a return of the target element to initial position, and means responsive to the return of the target element toward initial position for reclutching said clutch means.

2. A target apparatus comprising a target element, a photosensitive cell movable with the target element, means for guiding said target element along a generally upward path, a flexible driving cable for said target element, a drive shaft, a drum thereon about which said flexible cable passes, a clutch connection between said shaft and drum, means for rotating said shaft in response to the hit of a flash of light against said cell, clutch means effective normally to cause said drum to move in unison with said shaft, means for declutching said clutch means whereby to cause a return of the target element to initial position, means responsive to the return of the target element toward initial position for reclutching said clutch means, means for rotating said shaft including a solenoid, and means for energizing said solenoid in response to the hit of a flash of light against said cell.

3. A target apparatus comprising a base, a carriage, means for guiding it along a predetermined path, said carriage being normally at rest when shot at, an indicator member associated with said carriage, and movable unitarily therewith, motor means for said carriage mounted on said base, a photosensitive cell, an actuating circuit including said photosensitive cell and said motor means, and means for causing said motor means to move said carriage along said guiding means when said cell is struck by a flash of light.

4. A target apparatus comprising a base, a carriage, means for guiding it along a predetermined path, said carriage being normally at rest when shot at, an indicator member associated with said carriage, and movable unitarily therewith, motor means for said carriage mounted on said base, a photosensitive cell, an actuating circuit including said photosensitive cell and said motor means, and means for causing said motor means to move said carriage along said guiding means when said cell is struck by a flash of light, said photosensitive cell being mounted on and movable unitarily with said carriage.

5. A target apparatus comprising a base, a carriage, means for guiding it along a predetermined path, said carriage being normally at rest when shot at, an indicator member associated with said carriage, and movable unitarily therewith, motor means for said carriage mounted on said base, a photosensitive cell, an actuating circuit including said photosensitive cell and said motor means, and means for causing said motor means to move said carriage along said guiding means when said cell is struck by a flash of light, said motor means including a solenoid controlled by said actuating circuit.

6. A target apparatus comprising a base, a carriage, means for guiding it along a predetermined path, said carriage being normally at rest when shot at, an indicator member associated with said carriage and movable unitarily therewith, motor means for said carriage mounted on said base, a photosensitive cell, an actuating circuit including said photosensitive cell and said motor means, means for causing said motor means to move said carriage along said guiding means when said cell is struck by a flash of light, a coin controlled switch, and means, effective when said switch is actuated, for returning said carriage along its path to a predetermined initial position.

7. A target apparatus comprising a base, a target element, a photosensitive cell movable with the target element, means for guiding said target element along a generally upward path, a motor mounted on said base, a driving connection between said motor and said target element, means for actuating said motor intermittently in response to the hit of a flash of light against said cell, whereby to move said target element a predetermined distance in response to each hit, and means for returning said target element to initial position.

8. A target apparatus comprising a base, a target element, a photosensitive cell movable with the target element, means for guiding said target element along a generally upward path, a motor means on said base, means for actuating said motor means intermittently in response to the hit of a flash of light against said cell and for thereby moving said target element upwardly a predetermined distance in response to each hit, and means for returning said target element to initial position.

9. A target apparatus comprising a base, a target element, a photosensitive cell movable with the target element, means for guiding said target element along a generally upward path, a motor mounted on said base, a driving connection between said motor and said target element, means for actuating said motor intermittently in response to the hit of a flash of light against said cell, whereby to move said target element a predetermined distance in response to each hit, and means for returning said target element to initial position, including means for breaking the driving connection between the motor and the target element.

10. A target apparatus comprising a base, a target element, a photosensitive cell movable with the target element, means for guiding said target element along a generally upward path, a motor mounted on said base, said motor being normally inoperative, a driving connection between said motor and said target element, means for actuating said motor intermittently in response to the hit of a flash of light against said cell, whereby to move said target element a predetermined distance in response to each hit, and means for returning said target element to initial position.

REGINALD D. FRENCH.